(12) United States Patent  
Joly et al.

(10) Patent No.: US 8,965,574 B2
(45) Date of Patent: Feb. 24, 2015

(54) METHOD FOR CONTROLLING AN AUTOMATED WORK CELL

(75) Inventors: Luc Joly, Faverges (FR); Jean Michel Bonnet Des Tuves, Saint Ferreol (FR); François Pertin, Annecy le Vieux (FR); Gérald Vogt, Lathuile (FR)

(73) Assignee: Staubli Faverges, Faverges (FR)

( * ) Notice: Subject to any disclaimer, the term of this patent is extended or adjusted under 35 U.S.C. 154(b) by 106 days.

(21) Appl. No.: 13/696,739

(22) PCT Filed: May 13, 2011

(86) PCT No.: PCT/FR2011/051078
§ 371 (c)(1),
(2), (4) Date: Jan. 22, 2013

(87) PCT Pub. No.: WO2011/141684
PCT Pub. Date: Nov. 17, 2011

(65) Prior Publication Data
US 2013/0116821 A1    May 9, 2013

(30) Foreign Application Priority Data

May 14, 2010  (FR) ...................................... 10 53771

(51) Int. Cl.
*G05B 19/00* (2006.01)
*B25J 9/16* (2006.01)
*G05B 19/408* (2006.01)

(52) U.S. Cl.
CPC .. *B25J 9/16* (2013.01); *B25J 9/161* (2013.01); *G05B 19/4086* (2013.01);
(Continued)

(58) Field of Classification Search
CPC .... A01N 1/0284; C12N 5/061; C12N 5/0612; C12Q 1/02; C12Q 3/00
USPC ......... 700/254; 422/73, 82.05, 82.08; 435/29, 435/288.7
See application file for complete search history.

(56) References Cited

U.S. PATENT DOCUMENTS 4,819,184 A * 4/1989 Jonsson et al. ................. 700/261
6,147,469 A * 11/2000 Uchida et al. ................. 318/675
(Continued)

FOREIGN PATENT DOCUMENTS

CN    1277684    12/2000
CN    2447131 Y   9/2001
(Continued)

*Primary Examiner* — Marc McDieunel
(74) *Attorney, Agent, or Firm* — Dowell & Dowell, PC

(57) ABSTRACT

A method for controlling an automated work cell which includes at least one robot arm having at least three degrees of freedom controlled according to a plurality of control axes; a control center; a device for controlling the robot arm which includes a plurality of motor controllers each controlling operation of one motor and suitable for operating at least one portion of the robot arm; and a communication bus between the control center and the device for controlling the robot arm; wherein the method includes steps of: a) sending instructions emitted by the control center to control the control axes to a single arithmetic unit belonging to the device for controlling the robot; b) determining, within the arithmetic unit and according to instructions received from the orders for each of the motors controlled by a motor controller; and c) sending each motor controller an order, determined in step b), for the motor controlled by each motor controller.

13 Claims, 2 Drawing Sheets

(52) U.S. Cl.
CPC ............... *G05B 2219/33273* (2013.01); *G05B 2219/39253* (2013.01); *G05B 2219/39384* (2013.01); *G05B 2219/39408* (2013.01)
USPC ....... 700/254; 422/73; 422/82.05; 422/82.08; 435/29; 435/288.7

(56) References Cited

U.S. PATENT DOCUMENTS

| | | | |
|---|---|---|---|
| 6,472,838 | B1 | 10/2002 | Shikazono et al. |
| 6,786,896 | B1 * | 9/2004 | Madhani et al. ................ 606/1 |
| 8,123,740 | B2 * | 2/2012 | Madhani et al. ................ 606/1 |
| 8,280,544 | B2 * | 10/2012 | Catoen et al. ................ 700/204 |
| 2004/0267404 | A1 | 12/2004 | Danko |
| 2005/0264252 | A1 * | 12/2005 | Mizuno et al. ................ 318/575 |
| 2006/0106492 | A1 | 5/2006 | Gerat et al. |
| 2011/0106285 | A1 * | 5/2011 | Catoen et al. ................ 700/99 |
| 2011/0106288 | A1 * | 5/2011 | Catoen et al. ................ 700/108 |
| 2013/0131864 | A1 * | 5/2013 | Jody et al. ................ 700/245 |

FOREIGN PATENT DOCUMENTS

| | | |
|---|---|---|
| CN | 1586829 | 3/2005 |
| CN | 1745349 | 3/2006 |
| CN | 101045297 | 10/2007 |
| WO | 2006/062648 A2 | 6/2006 |
| WO | 2006/062948 A2 | 6/2006 |

* cited by examiner

METHOD FOR CONTROLLING AN AUTOMATED WORK CELL

BACKGROUND OF THE INVENTION

1. Field of the Invention

The invention concerns a method of controlling a work cell comprising a robot, a control center, a device for controlling the robot and a bus for communication between the control center and the device controlling the robot.

2. Brief Description of the Related Art

In the field of the control of robotic arms, it is known that a control center communicates, by means of a bus, with axis controllers able to control motors for moving the various parts of a robot. Such a control center interprets the movement instructions given by a user or a program created by the user, so as to define instructions for movement of each of the movement axes of the robot.

The movements of the parts of the robot with respect to the various axes are calculated at the control enter by applying an inverse geometric model that depends on the type of robot arm used. To effectively move the various parts of the robot, each of the robots is ordered to make movements corresponding to the axis movement instructions.

Since each robot has specific kinematic characteristics, it is necessary to incorporate, in the control center, characteristics intrinsic to the type of robot used. The result is relatively severe complications in the programs incorporated in the control center.

Since the control center communicates with each of the axis controllers, whereas the movement orders concern each of the parts of the robot, this communication gives rise to the need to transmit the order from the control center to each of the axis controllers, which gives rise to relative long communication times.

SUMMARY OF THE INVENTION

It is these drawbacks that the invention sets out to remedy by proposing a novel method of controlling an automated work cell, simplifying the programming of the control center, improving the speed of communication with the various axis controllers and improving the precision of the control of the robot.

To this end, the invention concerns a method of controlling an automated work cell, including at least one robot arm with at least three degrees of freedom controlled according to several control axes, a control center, a device controlling the robot arm, including several motor controllers each controlling the functioning of a motor able to maneuver at least part of the robot arm, and a bus for communication between the control center and the control device of the robot arm. This method is characterized in that it comprises the following steps:

a) transmitting instructions, sent by the control center for controlling the control axes, to a single computing unit belonging to the device controlling the robot arm;

b) determining, in this computing unit and from several of the instructions received from the control center, instructions for each of the motors controlled by a motor controller;

c) transmitting to each motor controller an order, determined at step b), for the motor controlled by this motor controller.

The control of the robot arm is based on the identification of movement control axes, that is to say geometric quantities such as lengths or angles that make it possible to express the movement of the end of the robot arm.

By virtue of the invention, the calculations of the movement orders for each of the robot motors are made independently in the unit that belongs to the robot control device, taking into account all the instructions sent by the control center. This optimises the functioning of the robot. The presence of the computing unit in the robot control device simplifies the programming of the control center, since the latter does not need to incorporate data specific to each robot and does not need to manage communication with each of the axis controllers.

As the instructions including the calculations of the movement orders for each of the robot motors are determined, in the computing unit that belongs to the robot control device, taking into account all the instructions sent by the control center, it is possible to optimise the functioning of the robot and of the robotic work cell. In addition, the computing unit uses the processing operations made necessary by the specificity of a robot arm. It thus saves the programmer of the control center cell the need to incorporate sophisticated stop or start procedures that form part of the know-how of robotics engineers. According to advantageous but not obligatory features of the invention, such a control method may incorporate one or more of the following features, taken with any technically acceptable combination:

The method comprises supplementary steps consisting in:

d) transmitting, from each motor controller and to the computing unit, the position of the motor that it controls;

e) calculating, in the computing unit and on the basis of all the positions of the motors, the positions of each of the control axes of the robot arm;

f) transmitting to the control center the positions calculated at step e).

The computing unit takes account in the calculation of step e) of the measurement times of the positions of the motor and the time of the transmission to the control center of the positions of each of the control axes of the robot arm in order to correct the positions of the control axes according to the presumed movement of the robot arm.

The method comprises supplementary steps consisting in:

g) calculating, in the computing unit and on the basis of all the positions of the motors, the cartesian speed of a characteristic point;

h) comparing the calculated cartesian speed with a threshold value;

i) transmitting, from the computing unit and to the control center, an alert signal if the cartesian speed is greater than the threshold value.

At step b), movement orders comprising the positions to be achieved for each motor in order to comply with the instructions sent by the control center are calculated.

At step b), the calculation of the movement orders for each motor is accompanied by a prediction of the torque to be supplied for each motor, based on the instruction send by the control center.

The instructions sent by the control center contain information on the load transported for at least one movement control axis.

The positions to be achieved for each motor for complying with the instructions sent by the control center include compensation for the deformations of the robot arm calculated from at least some of the torque predictions.

The method comprises a step consisting in: j) transmitting to the control center a signal representing the state of powering up of the robot arm in which the robot arm is respectively declared as ready to function or powered down, only if all the motors are powered up or powered down and braked.

The method comprises a step consisting in: k) transmitting, from the computing unit and to the control center, a signal representing the state of functioning of all the parts of the robot arm, in which all the parts of the robot arm are declared to be faulty if at least one of these parts is detected as not functioning.

The bus supports a synchronous communication mode.

The bus functions on an interface model of the SERCOS type, wherein SERCOS stands for Serial Real-Time Communication System of a type the links motors and drive controls.

The control center communicates with the computing unit using the commands of the "profile drive" hardware profile.

BRIEF DESCRIPTION OF THE DRAWINGS

The invention will be better understood and other advantages thereof will emerge more clearly in the light of the following description of a method of controlling an automated work cell according to its principle, given solely by way of example and made with reference to the accompanying drawings, in which.

DESCRIPTION OF THE PREFERRED EMBODIMENT

Figure 1:
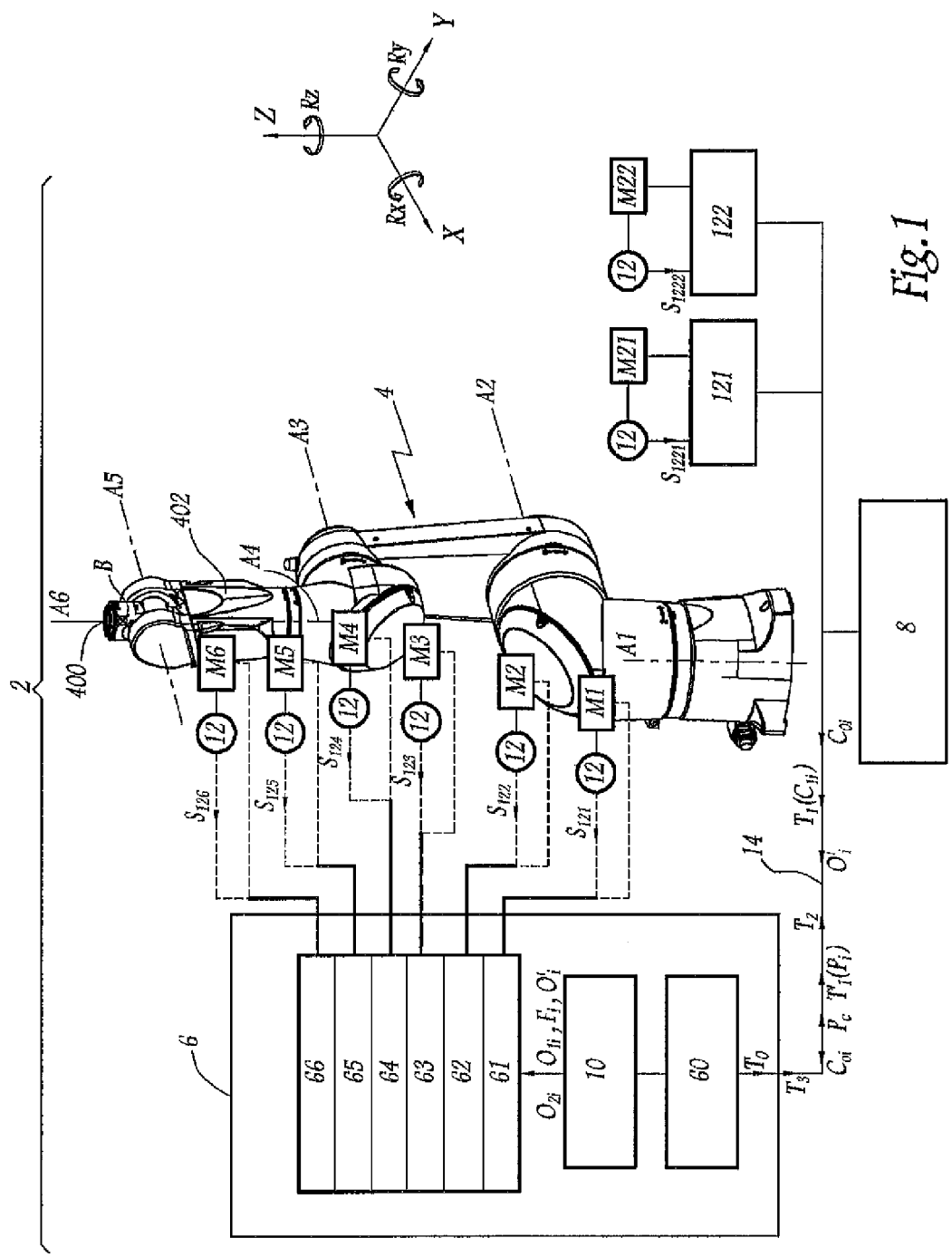
FIG. 1 is a structural diagram of an automated work cell using a control method according to the invention.

A shown in FIG. 1, an automated work cell 2 comprises a robot arm 4, a device 6 controlling the robot arm 4, a control center 8 and two electrical actuators partially shown. The robot arm 4 consists here of a robotic arm with six axes referenced A1 to A6. The term "axis" is here used in the robotic sense, that is to say concerns a degree of freedom. In the case in question, the degrees of freedom or axes A1 to A6 are rotations.

The device 6 controlling the robot is placed close to the robot arm 4 and comprises six motor controllers 61 to 66. Each of these motor controllers 61 to 66 is able to control the functioning of a motor M1 to M6 able to maneuver a part of the robot arm 4.

Actuation of the motor M1 allows the overall rotation of the part of the robot arm 4 situated between the axis A1 and the movable end of the robot arm 4 without any other axis turning on itself. Likewise, actuation of the motors M2, M3, M4 and M6 allow respectively the isolated rotation of the axes A2, A3, A4 and A6. On the other hand, actuation of the motor M5 results in the rotation of the axes A5 and A6. There exists a coupling between the axes A5 and A6 and an isolated rotation of the axis A5 requires actuation of the motors M5 and M6. Each of the motors M1 to M6 is equipped with a coder 12 placed on the motor shaft, for measuring the angular position of the motor shaft and delivering an electrical signal $S_{12i}$, for i integer between 1 and 6, containing the information on this position. Each of the two electrical actuators is maneuvered by a motor M21 and M22, each of these motors being respectively controlled by an axis controller 121 and 122 and associated with a coder 12 that delivers a position signal $S_{1221}$ or $S_{1222}$.

Figure 2:
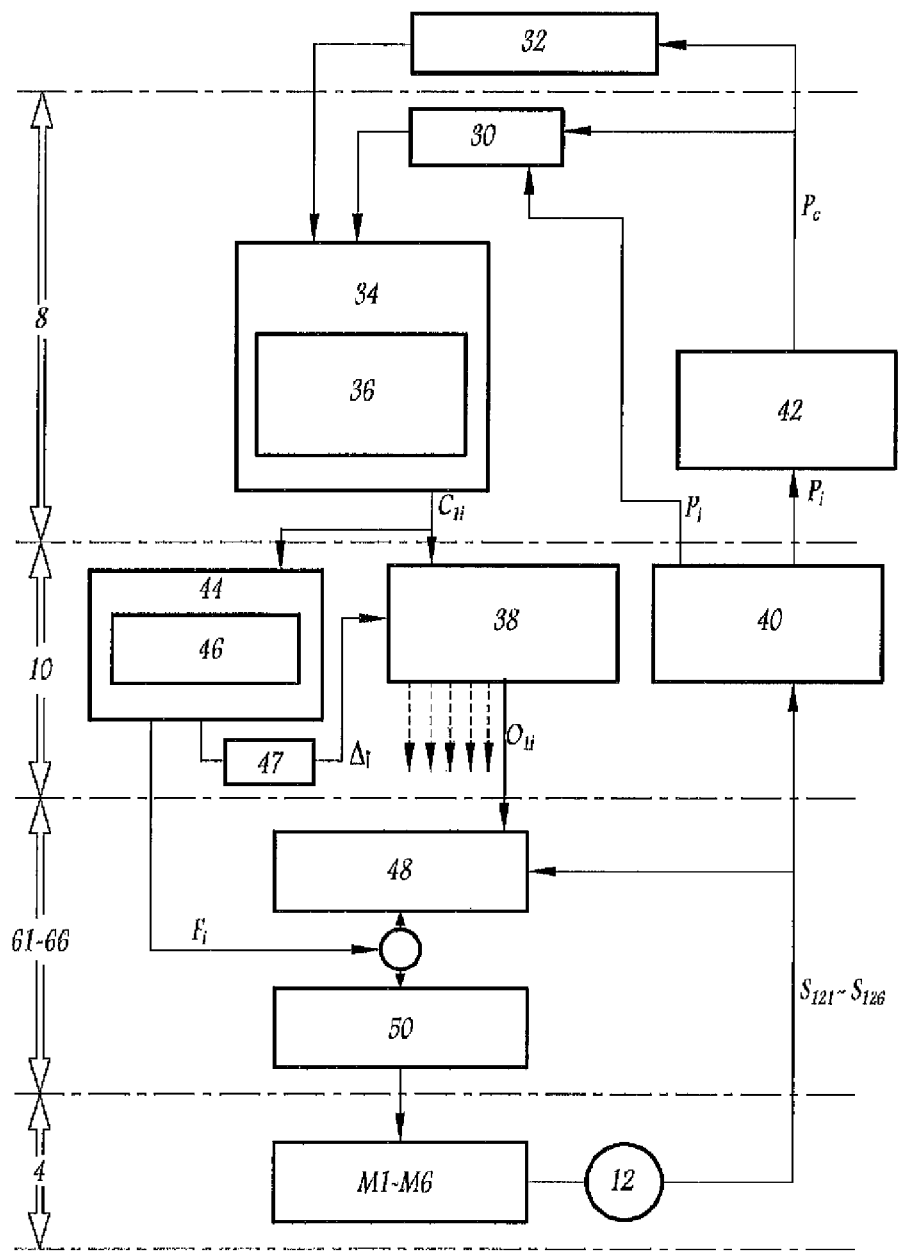
FIG. 2 is a functional outline diagram that shows the main functions and the communication flows in relation to the control method according to the invention.

As shown schematically in FIG. 2, the control center 8 controls the functioning of the automated cell 2 from programs 30 created by users for performing precise actions, such as for example the assembly of an object requiring movements of the robot arm 4 and optional actions of a gripper or conveyor that comprises the electrical actuators maneuvered by the motors M21 and M22. For example, such programs may contain series of cartesian coordinates to be reached by the end of the robot arm 4.

In a variant, the actions can be decided in real time by the user from a fixed or portable control panel 32 accessible to the user or to the programmer of the automated work cell 2.

The control center 8 communicates with the control device 6 by means of a fieldbus 14, preferably functioning on the SERCOS III series real-time interface. The control center 8 is "master" whereas the control device 6 is "slave".

The control device 6 comprises a communication card 60 dedicated to communication with the control centre 8 by means of the fieldbus 14.

The control device 6 also comprises a computing unit 10, the function of which is to produce and transmit instructions such as movement or powering-up orders to the motor controllers 61 to 66. The computing unit 10 comprises in particular for this purpose microprocessors and memories. The computing unit 10 is able to communicate with each of the motor controllers 61 to 66. In this way, each data transmission between the motor controllers 61 to 66 and the control center 8 is managed by the computing unit 10, both from the motor controllers to the center and from the center to the motor controllers.

The control axes of the robot arm 4 are chosen as being the axes A1 to A6 that correspond to the degrees of freedom of the robot arm 4.

During the initialisation phase particular to the SERCOS III interfacing model, the communication is defined so that each axis A1 to A6 of the robot arm 4 is associated with a notional axis controller. These notional axis controllers are deemed to receive instructions from the control center 8, in the same way as generic axis controllers, and to control at least one motor on the basis of these instructions. They are declared to be in accordance with the "profile drive" hardware profile that defines a set of commands for configuration, control, interrogation of states and positions, diagnosis and supervision. The instructions produced by the control center 8 on the basis of the commands associated with the "profile drive" hardware profile and usable by the notional axis controllers are received by the computing unit 10. Each notional axis controller is allocated an address in the same way as the two axis controllers 121 and 122 that control the actuators external to the robot arm 4 and are present in the automated work cell 2.

The control method according to the invention is applied to the powering-up phase of all the motors of the robot arm 4 prior to any operation of the robot arm of the automated work cell 2. This powering up is initiated by the control center 8, which sends over the bus 14 one or more master data telegrams comprising instructions $C_{oi}$, with i between 1 and 6, for powering up each of the axes A1 to A6. The communication card 60 of the control device 6 captures these telegrams. It then sends interrupt demands to the computing unit 10, which recovers these telegrams, extracts the instructions $C_{oi}$ from them for each of the axes A1 to A6 of the robot arm 4 and proceeds with processing thereof. The SERCOS III interfacing protocol provides for each of the devices connected to the bus 14 to be instructed on the location of the data that concern it in a master data telegram. The computing unit 10 records the powering-up instructions and sends a response telegram to the control center 8 in which the axes to which the instruction relate are declared to be powered up. The motors are not actually powered up and the brakes released until the last powering-up instruction sent by the control center 8 is received. Powering-up instructions $O_{2i}$, with i between 1 and 6, for each motor M1 to M6, are sent by the computing unit 10 to each motor controller 61 to 66. When all the motors are powered up and the computing unit 10 has received from the motor controllers 61 to 66 the information that each of the motors M1 to M6 is powered up, a telegram $T_0$, indicating to the control center 8 that the last axis is ready to function, is sent by the computing unit 10, through the card 60.

For the programmer of the control center 8, the powering-up orders for the motors M1 to M6 of the axes A1 to A6 of the robot arm 4 are similar to the powering-up orders for the other motors M21 and M22 used in the automated cell 2 since the axes of the robot arm 4 and the other two axes are known to the control center 8 as being in accordance with the "profile drive" hardware profile. As the computing unit 10 considers all the instructions intended for each of the axes A1 to A6 of the robot arm 4 in order to manage the powering up of the various motors, programming of the control center 8 is simplified.

When the automated cell 2 implements the process that it automates, the control center 8 executes an operating program 30 that contains movement orders that the robot must execute. At each communication cycle, the movement instructions $C_{1i}$, with i between 1 and 6, for each axis A1 to A6 associated with a notional axis controller of the robot arm 4 are calculated by a path generator 34 that uses an inverse geometric model 36 when the movement orders of the robot arm 4 express the cartesian coordinates of a movement of its end. In accordance with the SERCOS III interfacing protocol, for each communication cycle defined, all the axis movement instructions $C_{1i}$ are sent over the bus in the form of a master data telegram $T_1(C_{1i})$. The communication card 60 receives this telegram. It then sends an interrupt demand to the computing unit 10, which recovers the telegram, extracts from it the axis movement instructions $C_{1i}$ and proceeds with processing thereof.

During this processing, the computing unit 10 calculates movement orders $O_{1i}$, with i between 1 and 6, for each of the motors M1 to M6 controlled by the motor controllers 61 to 66. The movement orders $O_{1i}$ for each of the motors are calculated from all the instructions Cu received coming from the control center 8 by applying the kinematic model of the transmissions 38. These orders comprise the positions to be achieved by the motors. The calculation then takes into account the coupling existing between the axis A5 and the axis A6, the movement of the axis A5 requiring the use of the motors M5 and M6. The calculation of the movement orders $O_{1i}$ for each motor also takes account of the reduction ratios between the motors and the robot rotation axes.

The movement orders $O_{1i}$ for each motor M1 to M6 are transmitted to the motor controllers 61 to 66 of each of the motors, which are responsible for determining and regulating the supply current to the motor phases.

The angular position of the shafts of each motor is detected by means of the coder 12 placed on the shaft of each motor. This information, transmitted to each motor controller in the form of signals $S_{121}$ to $S_{126}$, makes it possible to slave 48 the supply current of the motor phases.

The computing unit 10 also has, through its connections with the motor controllers 61 to 66, the angular position of the shafts of each motor of the robot arm 4 and calculates the angular positions $P_i$, with i integer between 1 and 6, of the parts movable about the axes A1 to A6 of the robot arm 4 by applying an inverse kinematic model of the transmissions 40. Because of the coupling of the axes A5 and A6, the angular positions of the shafts of the motors M5 and M6 act in the determination of the angular position $P_6$ of the axis A6. The computing unit 10 can also, from the measurements, calculate the rotation speeds of the movable parts about the axes of the robot, the torques supplied by these movements, or any other useful data.

Consequently, and according to the SERCOS III communication protocol, at each synchronous communication cycle, the computing unit 10 of the robot produces a data telegram $T'_1$ that contains the angular positions $P_i$ of the axes of the robot arm 4 and transmits it to the control center 8 through the communication card 60. This information can then be used by the program 30, which governs the functioning of the automated cell 2. The control center 8 can apply a direct geometric model 42 in order to obtain for example the cartesian position $P_c$ of the end of the robot arm 4, which can then be displayed on the control panel 32.

The computing unit 10 can calculate the cartesian position of at least one characteristic point B, for example situated on a tool clamp 400 at the end of the robot arm 4, from the angular positions $P_i$, with i integer between 1 and 6, of the parts movable about axes A1 to A6 of the robot arm 4 and can derive therefrom the cartesian speed V(B) of this characteristic point. A comparison with a predefined threshold is made at the computing unit 10. If the cartesian speed V(B) of this characteristic point B is greater than this threshold, the computing unit 10 sends a stop command to all the motor controllers 61 to 66 and sends to the control center 8 a telegram to indicate the error.

In a variant, the computing unit 10 calculates the cartesian speed V(B) of the characteristic point from the movement instructions $C_{1i}$, with i between 1 and 6, for each axis A1 to A6 associated with a notional axis controller of the robot arm 4.

The behaviour the robot arm 4 is substantially improved if the slaving of each motor takes account of a prediction of the torque $F_i$, with i between 1 and 6, applied to the articulations because of gravity or inertia forces. This torque prediction $F_i$ is established for each motor of the robot arm 4 at the computing unit 10, which uses a dynamic model 44. The dynamic model is based on knowledge of the movement instructions $C_{1i}$ of each axis, which make it possible to evaluate the accelerations required at each part of the robot arm 4. Because of the structure of the robot arm 4, the prediction of the torque $F_i$ on the shaft of each motor of the robot arm 4 must take into account the movement instructions $C_{1i}$ of all the axes A1 to A6. Once the torque prediction $F_i$ is established, it is translated into a current instruction by applying the data or "constants" 46 of the motors and transmitted to the motor controllers 61 to 66 in order to be incorporated as an input to the control loops 50 for the motor phase supply currents.

According to a variant, the calculation of the prediction of the torque $F_i$ to be supplied at each articulation can also use the angular positions $P_i$ of the axes of the robot arm 4.

The prediction of the torque $F_i$, with i between 1 and 6, applied to the articulations is all the more precise since it takes into account the loads to be transported by the robot arm 4. Each load is characterized by a mass, the position of its center of gravity and its inertia matrix but also the degree of freedom to which it is attached. The programmer of the control center 8 can declare the loads transported with respect to each movement control axis of the robot arm 4. For example, for a load transported at the tool clamp 400, he will declare a load through the commands dedicated to the control axis A6. For a load transported at the front arm 402, he will declare a load through the commands dedicated to the control axis A4. These declarations of load transported can be done asynchronously, that is to say outside the cyclic communication between the control center 8 and the computing unit 10. They can also be done synchronously, which makes it possible to vary the load transported at each command sent by the control center 8 and to adapt the control of the robot arm 4 to a sequence of movements during which the robot arm would grip and transport a load before releasing it and undertake another movement.

The method according to the invention enables the loads transported to be taken into account at the computing unit 10 so as to simplify the formation of the control center 8.

The method according to the invention also affords an improvement in the precision of the path of a tool, not shown, placed at the end of the robot arm 4, taking into account the deformations of the robot arm under the effect of the load. These deformations may result from the flexibility of the structure elements such as the arms or transmission elements such as the belts or gears. From the movement instructions of each axis, the dynamic model 44 predicts each torque $F_i$, with i between 1 and 6, applied to the articulations because of gravity and inertia forces. These torques $F_i$ make it possible to obtain, by applying a flexibility matrix particular to the robot arm 4, the articular deviations Δi, with i between 1 and 6, due to the deformations. The articular deviations Δi make it possible to provide compensation for the deformations of the robot arm 4, and are then added to the movement instructions of each axis and therefore taken into account in the calculation of the movement instructions $O_{1i}$, with i between 1 and 6, for each of the motors M1 to M6 controlled by the motor controllers 61 to 66.

These articular deviations Δi are also subtracted from the angular positions Pi, with i integer between 1 and 6, of the parts movable about the axes A1 to A6 of the robot arm 4, which stem from the application of the inverse kinematic transmission model 40 to the angular positions of the shafts of each motor of the robot arm 4.

In a variant, the calculation of the articular deviations Δi can be established while taking account only of the part of the torques Fi corresponding to gravity, that is to say to static forces.

The method according to the invention also takes into account any defects in functioning of each of the parts of the robot 4. The computing unit 10 of the control device 6 of the robot arm 4 supervises the functioning of all the motor controllers 61 to 66. It uses software that detects the defects in functioning at the motor controllers 61 to 66, motors M1 to M6 or coders 12. Where a breakdown of a motor occurs, the computing unit 10 stops all the other motors of the robot arm 4 and demands the sending, to the control center 8, of a data telegram $T_2$ in which not only the axis the rotation of which is normally permitted by the motor in question is declared to be broken down, but also all the axes of the robot arm 4. In other words, an operating defect on one of the axes of the robot arm 4 gives rise to the declaration that it is impossible for the whole of the robot arm to function. This information is sent to the control center 8.

Since the control center 8 does not have to manage the decommissioning of all the axes of the robot, its programming is simplified. This avoids communication between each motor controller 61 to 66 and the control center 8, which accelerates the processing of defects and improves the security of the robot arm 4.

As has just been described, the computing unit 10 provides the coherence of the behaviour of the robot arm 4 in the event of a fault on one of the axes A1 to A6. The same applies when one of the axes of the robot arm 4 is powered down. Each of the motors M1 to M6 must then necessarily powered down. In addition, for safety reasons, the powering down of a motor must be preceded by the application of brakes stopping the rotation of the motors. The instruction to power down the robot arm 4 coming from the control center 8 is applied by the computing unit 10 to each of the motor controllers. As soon as an instruction to power down one of the axes Ai, with i integer between 1 and 6, of the robot arm 4 is detected by the computing unit 10, this instruction is generalised to all the motors M1 to M6 of the robot arm 4. The computing unit 10 then sends to each motor controller 61 to 66 an instruction O'i, with i between 1 and 6, to power down the motors M1 to M6. When the current is actually cut, the computing unit 10 checks that the shafts of each of the motors of the robot arm 4 are indeed braked in order to prevent any accident. When all the checks are made, the computing unit 10 sends a telegram $T_3$ specifying to the control center 8 that all the axes Ai, with i integer between 1 and 6, of the robot arm 4 have been powered down.

The method of the invention improves the synchronization of the movements managed by the control center 8. It relies on a client-server communication model in which the control center 8 is the server. The bus 14 affords a synchronous communication mode. Communication between the control center 8 and the control device 6 of the robot arm 4 by means of the bus 14 takes place at a frequency, referred to as the communication frequency, that is adapted to the number of devices, such as the motor controllers, to be controlled.

The computing unit 10 functions at a frequency, referred to as the control frequency, that is higher than the communication frequency.

The slaving carried out in a motor controller 61 to 66 is done at a frequency, referred as the slaving frequency, that is higher than the control frequency. Calculations of interpolations are therefore necessary between each transmission of a movement order $O_{1i}$ for the motors of the computing unit 10 to the motor controller. These calculations are made in each motor controller 61 to 66.

The operating program of the automated work cell 2 used by the control center 8 generates instructions $C_{1i}$ and requires knowledge of the angular positions $P_i$ of the axes of the robot arm 4. At each transmission of an instruction $C_{1i}$, the control center 8 requests the angular positions of each of the axes of the robot arm 4. The computing unit 10 has available the positions of the shafts of each motor by means of the coders 12. They come to it from the motor controllers 61 to 66 and enable it to calculate the angular positions $P_i$ of the axes of the robot arm 4 by applying the inverse kinematic model of the transmissions 40. These processing operations and data transmissions generate delays liable to desynchronize the computing unit 10 and the control center 8. To avoid such desynchronization, the computing unit 10 times the angular position information coming from the motor controllers 61 to 66. Each measurement of the angular position of the motor shaft detected by the coders 12 is therefore associated with a measurement time. As the communication by the bus 14 is of the synchronous type, the computing unit 10 knows at what moment it will have to send the angular position values $P_i$ of the axes of the robot arm 4 at the request of the control center 8. They are then corrected according to the measurement time, according to the presumed movement of the robot arm 4 at the moment of measurement and the interval of time separating the measurement time from the time of transmission to the control center 8. The computing unit 10 performs a synchronization.

In a variant, the control method according to the invention can use a bus carrying an asynchronous communication mode.

In another variant, the method according to the invention can be implemented with a CAN (controller area network) bus that integrates a CANopen application layer. It is also compatible with the Powerlink and EtherCAT communication protocols (Ethernet Control Automatic Technology is an open high performance Ethernet based flexbus system created by Beckhoff Automation).

According to another variant, the movement control axes of the robot arm 4 are chosen as being the cartesian axes X, Y, Z and the corresponding rotations Rx, Ry, Rz instead of the axes A1 to A6 of the robot arm 4. The programmer of the control center 8 then expresses the required movements of the end of the robot arm 4 in three directions X, Y and Z and the orientation of the end of the robot arm 4 according to the rotations Rx, Ry and Rz about the axes X, Y and Z. In this case, the control center 8 transmits, to the control device 6 of the robot arm 4, cartesian positions to be reached. This simplifies the programming of the control center 8, since it is not necessary to include therein the characteristics specific to the robot controlled. The computing unit 10 incorporates the inverse geometric model of the robot arm 4 and uses it to determine the movement instructions intended for the motor controllers 61 to 66. Likewise the computing unit 10 incorporates and uses the direct geometric model that makes it possible to calculate before transmitting to the control center 8 the positions of the movement control axes X, Y, Z and the corresponding rotations Rx, Ry, Rz from the angular positions of the shaft of each motor of the robot arm 4.

The invention is not limited to the use of a robot with 6 degrees of freedom and can apply for example to robots with 7 degrees of freedom. In this case, the programmer can advantageously choose, as the movement control axes, the cartesian axes X, Y, Z and the corresponding rotations Rx, Ry, Rz of movement of the end of the robot arm. The computing unit of the control device of the robot arm will use the sophisticated inverse geometric model for solving the redundancies.

The invention has been described with a control device for the robot 6 that comprises a communication card 60, a computing unit 10 and motor controllers 61 to 66. The computing unit 10 is able to process the information coming from the control center 8 and generate movement instructions intended for the motor controllers 61 to 66. These motor controllers 61 to 66 are functionally similar to normal axis controllers such as the axis controllers 121 and 122. They receive position instructions and provide the slaved control of the currents that supply the phases of the electrical actuators. However, the invention also applies to a structure that uses a computing unit directly capable of generating the current instructions intended for the power cards, not shown. These power cards are able to control the currents flowing in the phases of one or more electrical actuators. The invention is not limited by the structure of the control device 6 of the robot arm 4.

According to a variant of the invention, the orders for each of the motors M1 to M6 controlled by a motor controller are determined from several, rather than all, the instructions $C_{1i}$, with i integer between 1 and 6, received from the control center 8.

The invention claimed is:

1. A method of controlling an automated work cell including:
    at least one robot arm with at least three degrees of freedom controlled according to several control axes,
    a control center,
    a device controlling the robot arm, including several motor controllers each controlling functioning of a motor for maneuvering at least a part of the robot arm, and
    a bus for communication between the control center and the control device of the robot arm,
    wherein the method comprises the steps of:
    a) transmitting instructions, sent by the control center for controlling the control axes, to a single computing unit belonging to the device controlling the robot arm;
    b) determining, in the computing unit and from several of the instructions received from the control center at step a), orders for each of the motors controlled by a motor controller; and
    c) transmitting to each motor controller an order, determined at step b), for the motor controlled by each motor controller.

2. The control method according to claim 1, including the supplementary steps of:
    d) transmitting, from each motor controller and to the computing unit, the position of the motor that it controls;
    e) calculating, in the computing unit and on the basis of positions of all of the motors, the positions of each of the control axes of the robot arm; and
    f) transmitting to the control center the positions calculated at step e).

3. The control method according to claim 2, including the supplementary steps of:
    g) calculating, in the computing unit and on the basis of all the positions of the motors, a cartesian speed of a characteristic point;
    h) comparing the calculated cartesian speed with a threshold value;
    i) transmitting, from the computing unit and to the control center, an alert signal if the cartesian speed is greater than the threshold value.

4. The control method according to claim 3, wherein the computing unit takes account, in the calculation of step e), the times of measuring the positions of the motors and the time of transmission to the control center of the positions of each of the control axes of the robot arm in order to correct the positions of the movement control axes according to the presumed movement of the robot arm.

5. The control method according to claim 1, wherein, at step b), movement orders including the positions to be reached for each motor for complying with the instructions sent by the control center are calculated.

6. Control method according to claim 5, wherein, at step b), the calculation of the movement orders for each motor is accompanied by a prediction of torque to be supplied for each motor, based on the instructions sent by the control center.

7. The control method according to claim 6, wherein the instructions sent by the control center contain information on a load transported for at least one movement control axis.

8. The control method according to claim 6, wherein the positions to be reached for each motor in order to comply with the instructions sent by the control center include a compensation for deformations of the robot arm calculated from at least some of the torque predictions.

9. The control method according to claim 1, including a step consisting in:
    d) transmitting to the control center a signal representing a state of powering up of the robot arm, in which the robot arm is respectively declared to be ready to function or powered down only if all the motors are powered up or powered down and braked.

10. The control method according to claim 1, including:
    d) transmitting, from the computing unit and to the control center, a signal representing a state of functioning of all parts of the robot arm, in which all the parts of the robot arm are declared to be faulty if at least one of these parts is detected as not functioning.

11. The control method according to claim 1, wherein the bus supports a synchronous communication mode.

12. The control method according to claim 1, wherein the bus functions on an interface model of a serial real-time communications system.

13. The control method according to claim 12, wherein the control center communicates with the computing unit using the commands of a profile drive hardware profile.

* * * * *